T. E. MURRAY.
VALVE.
APPLICATION FILED FEB. 16, 1918.
1,270,049.
Patented June 18, 1918.
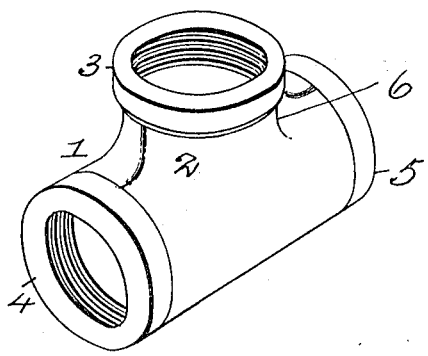
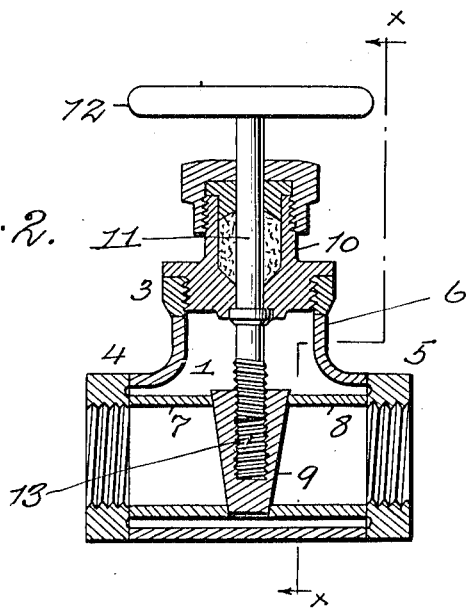
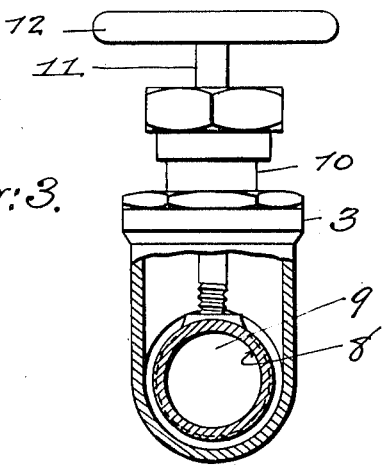
INVENTOR
Thomas E. Murray
BY
his ATTORNEY

UNITED STATES PATENT OFFICE.

THOMAS E. MURRAY, OF NEW YORK, N. Y.

VALVE.

1,270,049.

Specification of Letters Patent.　Patented June 18, 1918.

Application filed February 16, 1918.　Serial No. 217,491.

*To all whom it may concern:*

Be it known that I, THOMAS E. MURRAY, a citizen of the United States, residing at New York, in the county of New York and State of New York, have invented a certain new and useful Improvement in Valves, of which the following is a specification.

The invention is a valve, and consists in the construction hereinafter set forth, whereby the device is simplified and cheapened.

In the accompanying drawings—

Figure 1 is a perspective view of the valve shell. Fig. 2 is a longitudinal section of the complete valve, and Fig. 3 is a transverse section on the line $x, x$ of Fig. 2.

Similar numbers of reference indicate like parts.

The valve shell, shown in perspective in Fig. 1, is a T pipe coupling and is preferably formed in two longitudinal half sections 1, 2, struck up from sheet metal and electrically welded together at their meeting edges. Three reinforcing rings 3, 4, 5 are respectively welded to the opposite ends of said shell and to the end of the lateral projection 6 thereon. Said rings are internally threaded. To the end rings 3, 4 are welded the outer ends of the tube sections 7, 8 which are disposed within the valve shell. Between the opposing extremities of said tube sections is interposed the gate valve 9 which may be wedge-shaped and seated between correspondingly shaped tube section extremities. The ring 5 on lateral projection 6 is covered and closed by a stuffing box 10, through which passes the valve stem 11. On one end of said stem is a hand wheel 12: the other end is threaded to engage a threaded opening 13 in valve 9. By suitably turning wheel 12, valve 9 is opened or closed.

The shell sections 1, 2 may be stamped from the same dies. The valve is seated simply between the ends of the tube sections. The parts of the shell, the reinforcing rings and the inner tube sections are united by electrical welding. As a consequence, the cost of manufacture is very small, and the assembling is practically instantaneous.

I claim:

1. A tubular valve shell, reinforcing rings welded to the faces of the opposite ends thereof, an inwardly extending tube section carried by each of said rings, a valve seated between the inner ends of said tube sections, and means for operating said valve.

2. A tubular valve shell having a lateral tubular projection, reinforcing rings respectively welded to the end face of said projection and to the faces of the opposite ends of said shell, a cover on said projection ring, an inwardly extending tube section carried by each of the rings on the ends of said valve shell, a valve seated between the inner ends of said tube sections, and a valve stem extending through said cover.

In testimony whereof I have affixed my signature in presence of two witnesses.

THOMAS E. MURRAY.

Witnesses:
GERTRUDE T. PORTER,
MAY T. McGARRY.